United States Patent [19]

Fischer

[11] Patent Number: 6,092,978

[45] Date of Patent: Jul. 25, 2000

[54] ALIGNMENT DEVICE USED TO MANUFACTURE A PLURALITY OF STRUCTURAL INSULATED PANELS

[75] Inventor: Fred A. Fischer, Louisville, Ky.

[73] Assignee: Fishchersips, Inc., Louisville, Ky.

[21] Appl. No.: 08/815,202

[22] Filed: Mar. 12, 1997

[51] Int. Cl.[7] .............................. B65B 35/42; B23Q 3/18
[52] U.S. Cl. ..................... 414/788; 269/13; 414/788.9
[58] Field of Search ................. 414/788, 788.9, 414/900; 269/10, 13, 291, 297, 905; 193/35 MD; 271/220, 224

[56] References Cited

U.S. PATENT DOCUMENTS

| | | | |
|---|---|---|---|
| 550,844 | 12/1895 | Ring .......................................... | 269/120 |
| 1,254,044 | 1/1918 | Johnson . | |
| 1,404,793 | 1/1922 | Priess . | |
| 2,526,987 | 10/1950 | Wilson .......................................... | 11/1 |
| 2,607,501 | 8/1952 | Jeffrey ..................................... | 414/900 |
| 3,030,867 | 4/1962 | Wright ..................................... | 414/900 |
| 3,846,054 | 11/1974 | Davis ....................................... | 425/110 |
| 3,866,763 | 2/1975 | Alduk ...................................... | 414/900 |
| 4,260,311 | 4/1981 | Hanses ..................................... | 411/900 |
| 4,403,899 | 9/1983 | Lampe et al. ............................ | 271/224 |
| 4,439,098 | 3/1984 | Rienks ..................................... | 414/900 |
| 4,509,740 | 4/1985 | Foresi et al. .............................. | 271/224 |
| 4,781,510 | 11/1988 | Smith et al. .............................. | 414/900 |
| 4,787,621 | 11/1988 | Sattler ...................................... | 414/900 |
| 4,819,554 | 4/1989 | Fleischer et al. .................. | 193/35 MD |
| 4,964,782 | 10/1990 | DeCrane ................................. | 414/900 |
| 4,997,514 | 3/1991 | Bielfeldt ................................. | 156/558 |
| 5,098,079 | 3/1992 | Sanborn, III ........................... | 271/220 |
| 5,123,160 | 6/1992 | Hopwood ............................... | 269/297 |
| 5,215,301 | 6/1993 | Oshino et al. .......................... | 271/224 |
| 5,277,743 | 1/1994 | Copeland ................................ | 156/556 |

FOREIGN PATENT DOCUMENTS

| | | | |
|---|---|---|---|
| 2046223 | 11/1980 | United Kingdom .................. | 271/224 |

*Primary Examiner*—Douglas Hess
*Attorney, Agent, or Firm*—James C. Eaves, Jr.; Greenebaum Doll & McDonald PLLC

[57] ABSTRACT

An alignment device used to manufacture a plurality of structural insulated panels A base with at least one end post and at least two side posts are provided so that a stack of a structural insulated panels or SIPs can be assembled thereon, cured thereon, and then removed together therefrom as a stack of SIPs. If a plurality of different sized SIPs are to be manufactured thereon, more posts can be provided on the end or side of the device, but they must be spaced so that any SIP will only engage one end post and two side posts. Drop indexers can be used to function as posts if adjacent stacks of SIPs are to be assembled. Index blocks can be used to recess the foam in a SIP.

15 Claims, 5 Drawing Sheets

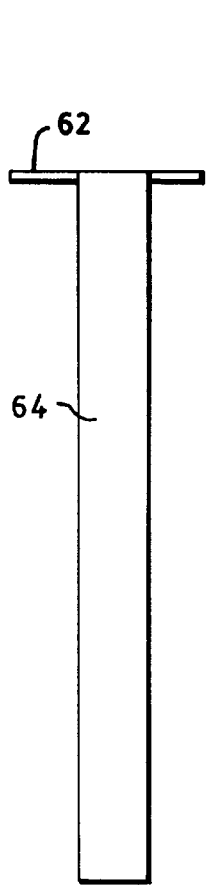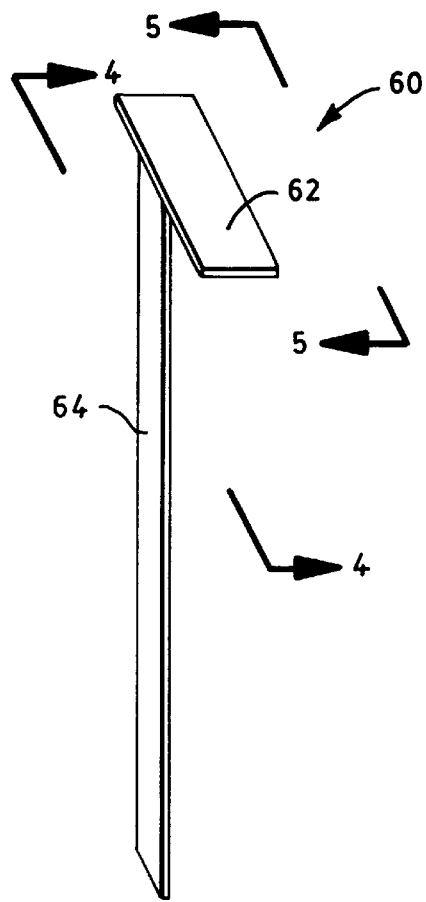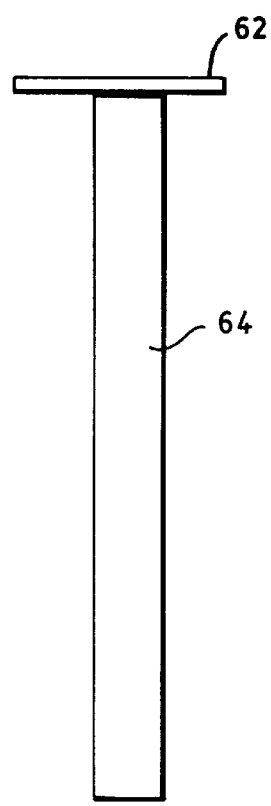
FIG. 4  FIG. 3  FIG. 5
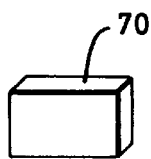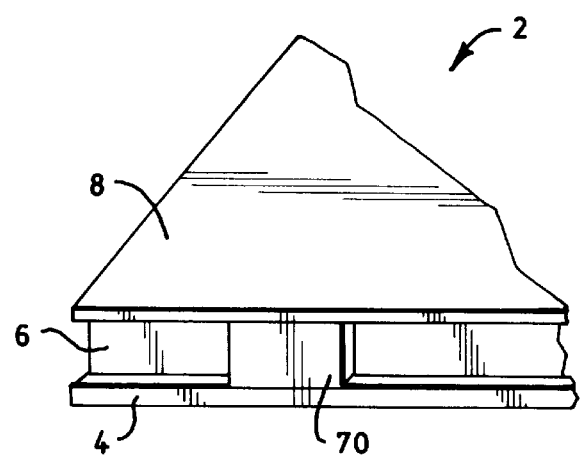
FIG. 6  FIG. 7

6,092,978

ALIGNMENT DEVICE USED TO MANUFACTURE A PLURALITY OF STRUCTURAL INSULATED PANELS

BACKGROUND OF THE INVENTION

1. Field of the Invention

The present invention relates to an alignment device used to manufacture a plurality of structural insulated panels, as well as the manufacturing method. A base with at least one end post and at least two side posts are provided so that a stack of a structural insulated panels (hereinafter "SIP") can be assembled thereon, cured thereon, and then removed together therefrom as a stack of SIPs.

2. Discussion of the Prior Art

U.S. Pat. No. 550,844, to Ring, teaches a book boarding apparatus. With reference to FIG. 7, a base A having an end stop D and two side stops E is used to "board" a stack of books.

U.S. Pat. No. 2,526,987, to Wilson, teaches a pad press wherein two boards at a ninety degree angle to each other receive sheets of paper thereagainst for forming writing pads.

U.S. Pat. No. 1,254,044, to Johnson, teaches that in a three point support, each point will always contact the work. In Johnson, the work is positioned against the three supports and then additional supports are moved into contact with the work to more securely retain the work for milling, for example.

DEFINITIONS

A "structural insulated panel" ("SIP") is in general an insulated building component consisting of two sheets of oriented strand board ("OSB") with expanded polystyrene foam laminated or glued therebetween. Alternatively, foam can be sprayed in place between the two sheets of OSB. The alignement device of the instant invention may be used for either manufacturing technique. SIPs are used to construct buildings and may be used as floor, wall, ceiling, or roof panels, or for any other appropriate building use. Alternatively, one or both of the sheets of OSB can be replaced with another material, for example, drywall, depending upon the planned use of the SIP. Typically, a SIP will be from 4' by 8' to 8' by 48', or even larger. In addition to 8' length, 4' wide panels could have lengths of 12', 16', 20', 24', or 48', for example. In addition to 48' length, 8' wide panels could have a length of 8' or another in between length, for example. The foam between the two sheets of OSB can have varying thickness depending on the use. For example, a panel with 3 11/16" thick foam could be used in constructing a wall and a panel with 5 11/16" thick foam could be used in constructing a standard roof. A panel with 7 7/16" or even 9 7/16" foam could be used for a thick roof, for example, in a heavy snow location. The panel is selected based upon the required load and insulation value. In manufacturing the panel, the OSB and the foam may overlap exactly or the foam may be recessed slightly, for example about 1½", on at least one side of the SIP. This is determined by the planned installation. For example, a 1½" plate can be placed on a floor deck where SIPs are to be installed. The foam at the bottom end of each SIP can be recessed 1½", such that when the SIP is placed over the plate, the plate and recess match and the OSB engages the floor deck. Nails can then be used to secure the OSB and the plate. Even further, the side edges of the SIP can be recessed, for example ¾", if a common 2×4 board is to be used between the SIPs to secure adjacent SIPs.

SUMMARY OF THE INVENTION

The present invention is for an alignment device used to manufacture a plurality of structural insulated panels, as well as the manufacturing method.

More particularly, the present invention comprises an alignment device having a relatively flat base on which a plurality of SIPs are to be assembled in at least one stack of panels. Depending upon the size of the SIPs and the size of the base, more than one stack of panels may be assembled before the assembled SIPs are cured, typically, an operation to dry the adhesive between the outer boards and the inner foam done in a r vacuum. To aid in assembly of the SIPs, the horizontal base has at least one vertically upstanding end post and at least two vertically upstanding side posts. These three posts serve as alignment stops. If the components of the SIP to be assembled all engage the three posts, the individual SIP, as well as the stack of SIPs, will be in vertical alignment. If, for example, the foam center is to be recessed from the outer boards, the boards will engage the three posts, but at least one index block of desired dimensions is placed against a desired post and the foam is placed against the index block to achieve the desired recess.

Also, if a plurality of adjacent stacks of SIPs is to be assembled for one curing operation, a drop indexer can be employed. The first stack of SIPs engages the three vertical posts. Either the end or side of the second stack of SIPs will engage an adjacent stack of SIPs. This side of the SIPs may not be uniform vertically. Therefore, the drop indexer acts like the post or posts for this new stack of SIPs which are to be adjacent to the other stack of SIPs. One (for end) or two (for side) drop indexers are placed on the respective end or side of the already assembled stack of SIPs. If the new stack is to be adjacent to two stacks of already assembled SIPs, one indexer is placed on one stack to be at the end of the new stack and two indexers are placed on the stack to be at the side of the new stack. These three drop indexers then function just like the three vertical posts of the horizontal base used to assemble the initial stack of SIPs.

The end of the base may contain more than one vertical end post and the side of the base may contain more than two vertical side posts. These additional posts are used to assemble SIPs of differing dimensions. However, the posts must be spaced such that any stack of SIPs to be assembled will only engage one end post and two side posts. For example, if a SIP could engage three side posts and it engaged the post in the center, the SIP may not be able to engage the side posts on each end of this center post. This could be due to the posts being out of alignment or to an irregular board or foam. This could cause improper alignment of the SIP. Therefore, only one of the end posts will abut the base and only the two side posts toward the two ends of the base will abut the base. We note that these posts do not have to abut, but the spacing of the posts is relative. Any other end post and any other side posts must be spaced further from the base than the abutting posts.

The SIPs are assembled by first placing a SIP board on the base, glueing both sides of a foam panel and placing the glued foam onto the SIP board, placing two SIP boards atop the foam, glueing both sides of a foam panel, and repeating until the SIP stack has reached the desired height when only one SIP board is placed atop the glued foam panel. If additional stacks are to be made, appropriate drop indexers are placed on the already made stack(s), and the process repeated. For example, on an 8' by 16' base, two 4' by 8' stacks and one 4' by 16' stack could be assembled to be cured together. For example, each stack could comprise about seven panels, depending on thickness of the panels and the height of the vertical posts.

After the SIPs are assembled, the glue must dry to permanently affix the outer boards to the foam sandwiched therebetween. Typically, to accelerate this process, a vacuum bag is placed over the assembled SIPs, a pump is activated to create a vacuum, for example of about 5 pounds per square inch, and the vacuum is maintained for a desired time, for example, for about 45 minutes. After this curing process, the vacuum bag is removed and the SIPs are ready for use.

To aid in removing the SIPs, pop-up rollers can be placed in the base. The rollers are "down" during assembly and curing and are then raised to elevate the stack(s) of SIPs above the base floor. Each entire stack can then be pushed off of the base as a stack. The stack can then be bound as a stack for transport to the installation site or for ease of storage.

Finally, the present invention comprises an alignment device, comprising: a base having a generally horizontal surface, the base having a first end and a first side, the base having at least one channel therein; at least one end post at the first end, the at least one end post extending generally vertically upward from the base, the at least one end post secured to the base a first distance from the first side; and at least a first side post and a second side post at the first side, the first side post and the second side post extending generally vertically upward from the base, the first side post secured to the base a second distance from the first end, the second side post secured to the base a third distance from the first end.

BRIEF DESCRIPTION OF THE DRAWINGS

A better understanding of the invention will be had upon reference to the following description in conjunction with the accompanying drawings in which like numerals refer to like parts and wherein:

FIG. 3 is a perspective view of a drop indexer;

FIG. 4 is a first side view of the drop indexer of FIG. 3 along the line 4—4;

FIG. 5 is a second side view of the drop indexer of FIG. 3 along the line 5—5;

FIG. 6 is a perspective view of an index block;

FIG. 7 is a perspective view of a portion of a SIP with recessed foam showing how an index block is used to create the recess;

DETAILED DESCRIPTION OF THE PREFERRED EMBODIMENT

Figure 1:
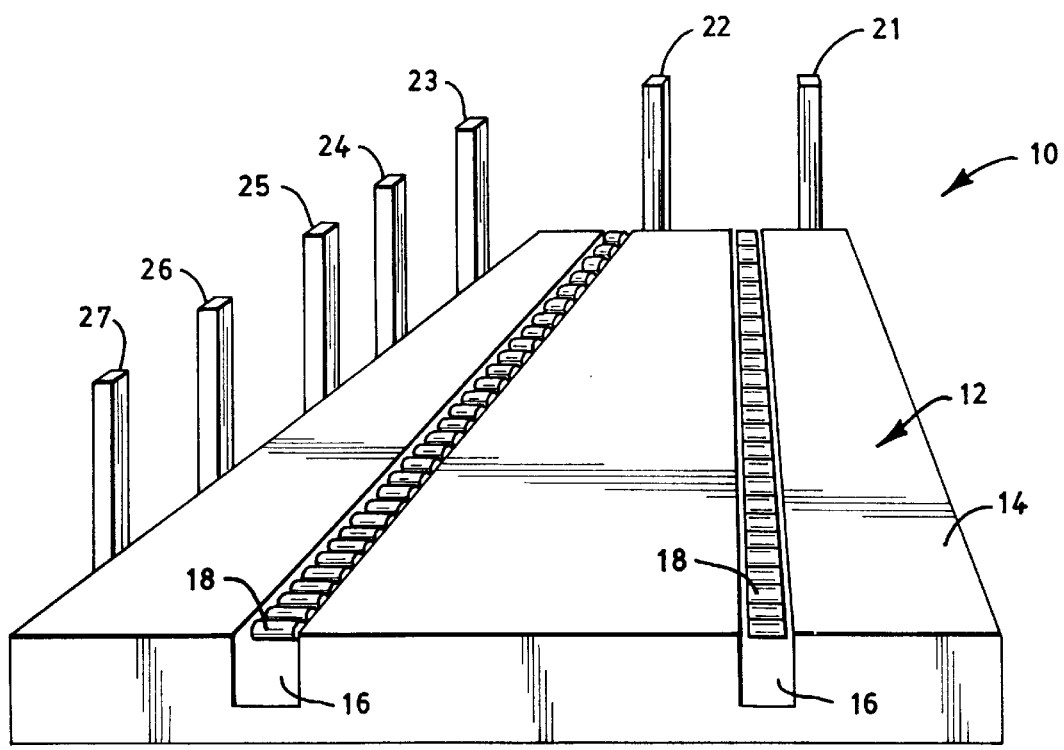
FIG. 1 is a perspective of an alignment device used to manufacture a plurality of structural insulated panels.

FIGS. 1–2 and 8–10 show alignment devices used to manufacture structural insulated panels 2, the alignment device 10 having a base 12 and at least one end post 22 and at least two side posts 23, 24. FIGS. 3–5 show a drop indexer 60 used in place of a post in assembling two stacks of adjacent SIPs. FIGS. 6–7 show an index block 70 and how it is used to recess foam 6 from the edges of boards 4 and 8 in a SIP 2.

Figure 2:
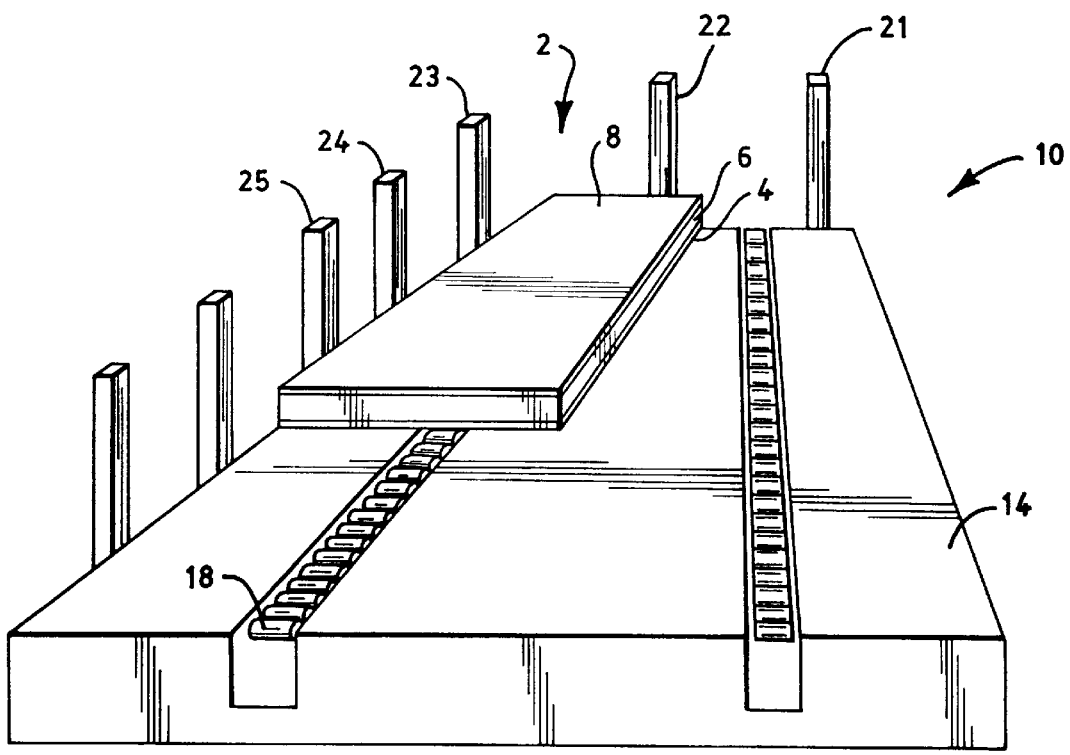
FIG. 2 is a perspective of an alignment device used to manufacture a plurality of structural insulated panels, the base of the alignment device having one SIP placed thereon.

The alignment device 10 of FIGS. 1 and 2 is shown having a base 12 having a generally horizontal surface 14 and a pair of channels 16 therein. For example, surface 14 may be about 8' wide and 16' long. Channels 16 are about 2' from each side of surface 14 and parallel thereto. Received within each channel 16 is a pop-up roller assembly 18, which is lowered when assembling and curing SIPs and is raised to permit the cured stack(s) of SIPs to be rolled off of the surface 14 as a stack. Typically, compressed air is used to raise the pop-up rollers. Two channels 16 are used because this device 10 is sized to make two 4' wide rows of SIPs side by side and one roller assembly 18 is used to remove one row of SIPs and the other roller assembly 18 is used to remove the other row of SIPs. There should simply be at least one roller assembly 18 for each row of SIPs to be manufactured on device 10.

Device 10 is shown having two end posts 21 and 22 and five side posts 23–27, posts 21–27 being generally transverse to surface 14. The number of posts and the location of the posts, as well as the length and width of surface 14, are determined by the possible dimensions of the SIPs to be manufactured on device 10. To properly align the SIPs during assembly, each SIP component should engage only one end post, or an end drop indexer 60 on an adjacent stack of SIPs, and only two side posts, or two drop indexers 60 on an adjacent stack of SIPs. Any other posts along the end or side of the SIP component should not engage the SIP component, as it would prevent a uniform placement of each SIP component in the vertical stack. Therefore, and as will be explained in more detail with the description of FIGS. 9 and 10, in FIG. 1, one end post, for example post 22, and two side posts, the two at the opposite side ends being 23 and 27, will be closest to or abut base 12. The other posts, 21 and 24–26, will be spaced further from base 12, for example, ½" further away. With reference to FIG. 2, a SIP 2, having outer boards 4 and 8 with foam 6 therebetween, is shown on device 10. The above described post spacing permits SIP 2 to engage end post 22 and side posts 23 and 25. While side post 24 is along the side of SIP 2, because posts 24 and 25 are ½" further from base 12 than post 23, SIP 2 does not touch post 24.

To manufacture a stack of SIPs, as seen in FIG. 2, the rollers 18 are placed in their down position. A SIP outer board 4, being OSB, drywall, particle board, plywood, or other desired material, is placed on surface 14 to engage posts 22, 23, and 25. Then, a piece of foam 6 has glue placed on both sides, for example, using a two sided glue coater with spaced rollers each applying glue to a side of the foam. The foam 6 with the glue thereon is placed atop the board 4. If this is not the last SIP in the stack, two boards, 8 and 4 for the second SIP, are placed atop the foam 6. Board 8 touches the glue on foam 6. Board 4 is the start of the next SIP. This process is repeated until the last SIP in the stack is being assembled when only one board 8 is placed atop the glued foam piece 6. Generally, a stack of SIPs will be made to a height of about 51" so that a double stack can be placed on a delivery truck without being "too" tall. Assembling additional adjacent stack(s) of SIPs is explained later.

The glue must now dry so that the foam 6 is secured to the two boards 4 and 8 sandwiching it. A vacuum is used to make the panels flat. Rather than having device 10 in a vacuum room, generally a vacuum bag and pump are used. The vacuum bag is placed over the assembled SIPs and the device 10. The bottom of the bag is sufficiently sealed against the floor or the base 12. Then, the pump pumps the air out of the bag to create the desired vacuum, for example 5 psi. After an adequate amount of time, for example, 45 minutes, the vacuum is released and the bag removed. The foam 6 and boards 4 and 8 are sufficiently adhered so that the stack of SIPs can be moved off of surface 14. By activating pop-up rollers 18, the stack of SIPs is elevated above surface 14 and the stack of SIPs can be rolled off of surface 14 as a stack for use. Generally, the stack will be secured and then stored as a stack or transported as a stack to the construction location.

With reference to FIGS. 3–5, a drop indexer 60 is shown, having a top plate 62 and a transverse bar 64. Top plate 62 will be placed and rest on the top board 8 of the topmost SIP in a stack and bar 64 will extend downward along the end or side of the stack of SIPs. Drop indexers 60 function like end and side posts when a stack of SIPs is being assembled adjacent a completed stack.

With reference to FIGS. 6 and 7, an index block 70 is shown. An index block will generally have a width approximately equal to or a little less than the width of the foam piece it will be used with and a thickness equal to the distance the foam is to be recessed. For example, an index block 70 used with 3 $^{11}\!/_{16}$" foam may have a width of about 3" and a length of about 6". Recessing of foam is done to facilitate installation. Usually, the recess receives a mounting plate, a spline, a beam, or even the foam of another SIP. Typical recess amounts may be $^{7}\!/_{16}$", $^{3}\!/_{4}$", or $1^{1}\!/_{2}$". For example, if adjacent SIPs are to have a 2×4 board therebetween, as the board has an actual thickness of $1^{1}\!/_{2}$", the foam of each panel would be recessed $^{3}\!/_{4}$". This would permit the SIPs to fully receive the 2×4 spline board with the adjacent SIP boards 4 and 8 of the two SIPs touching. The SIPs can be secured to the 2×4 board and a continuous smooth surface is created on both sides of the SIPs.

FIG. 7 shows how an index block 70 is used. After a board 4 is placed on surface 14 or a board 8, index block 70 is placed at the end post and/or the side posts for the end and/or side of the foam 6 to be recessed. The foam with glue thereon is then placed atop board 4 such that foam 6 pushes block 70 against its respective end or side post. After the glue dries, the index blocks 70 are removed and reused.

Figure 8:
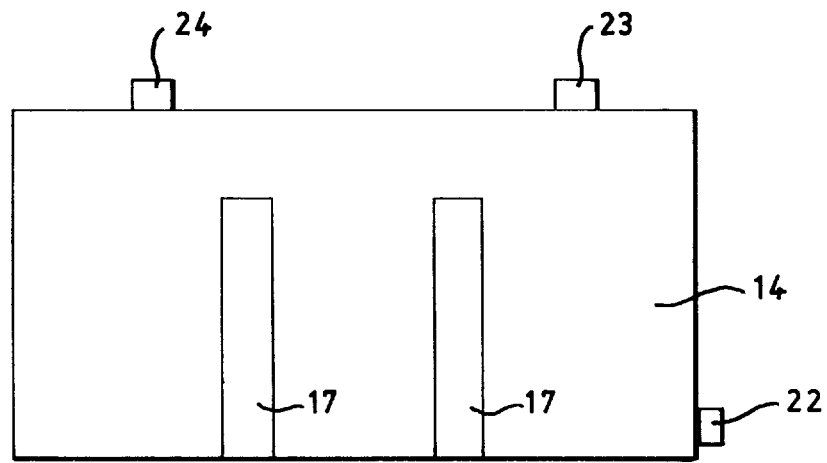
FIG. 8. is a top plan view of an alignment device used to manufacture a plurality of structural insulated panels having one end post and two side posts.

FIG. 8 shows a simple three post alignment device. Surface 14 has a transverse end post 22 and two transverse side posts 23 and 24. This would generally be used to assemble SIPs of the same size, each SIP component being aligned by engaging posts 22, 23, and 24. Instead of the pop-up rollers 18 in channel 16 shown in FIG. 1, any of the devices could include at least one set of channels 17 to receive the forks of a fork lift for removing the panel stacks, as shown in FIG. 8. Multiple pairs of channels 17 can be provided depending on the size of the alignment device.

Figure 9:
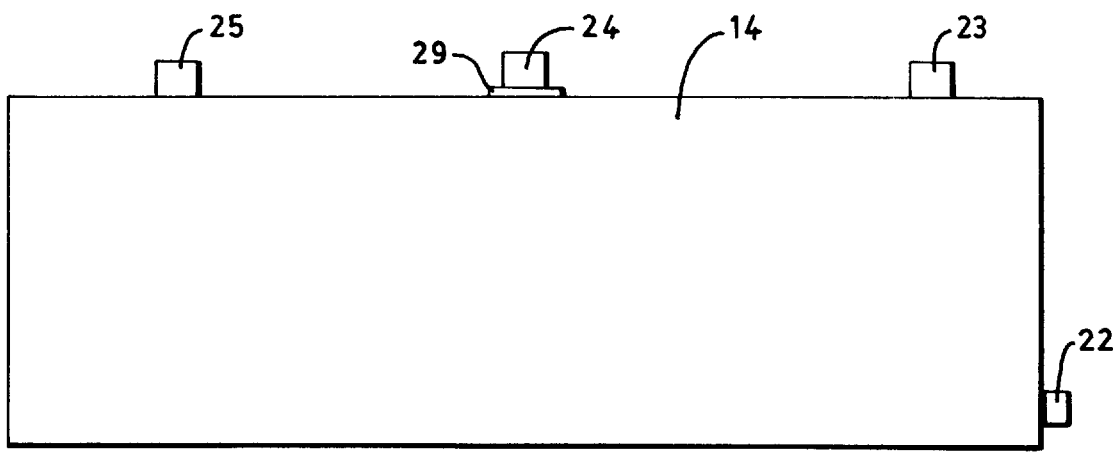
FIG. 9. is a top plan view of an alignment device used to manufacture a plurality of structural insulated panels having one end post and three side posts; and, FIG. 10. is a top plan view of the preferred alignment device used to manufacture a plurality of structural insulated panels having two end posts and six side posts.

FIG. 9 shows a four post alignment device. Surface 14 has a transverse end post 22 and three transverse side posts 23, 24, and 25. Post 24 has a spacer 29 between it and surface 14 so that post 24 is further from surface 14 than posts 23 and 25. This device would generally be used to assembly SIPs of "full" length or "reduced" length. For reduced length SIPs, each SIP component would be aligned by engaging posts 22, 23, and 24. For full length SIPs, each SIP component would be aligned by engaging posts 22, 23, and 25. Post 24, because of spacer 29, between base 14 and post 24, would not be engaged.

Figure 10:
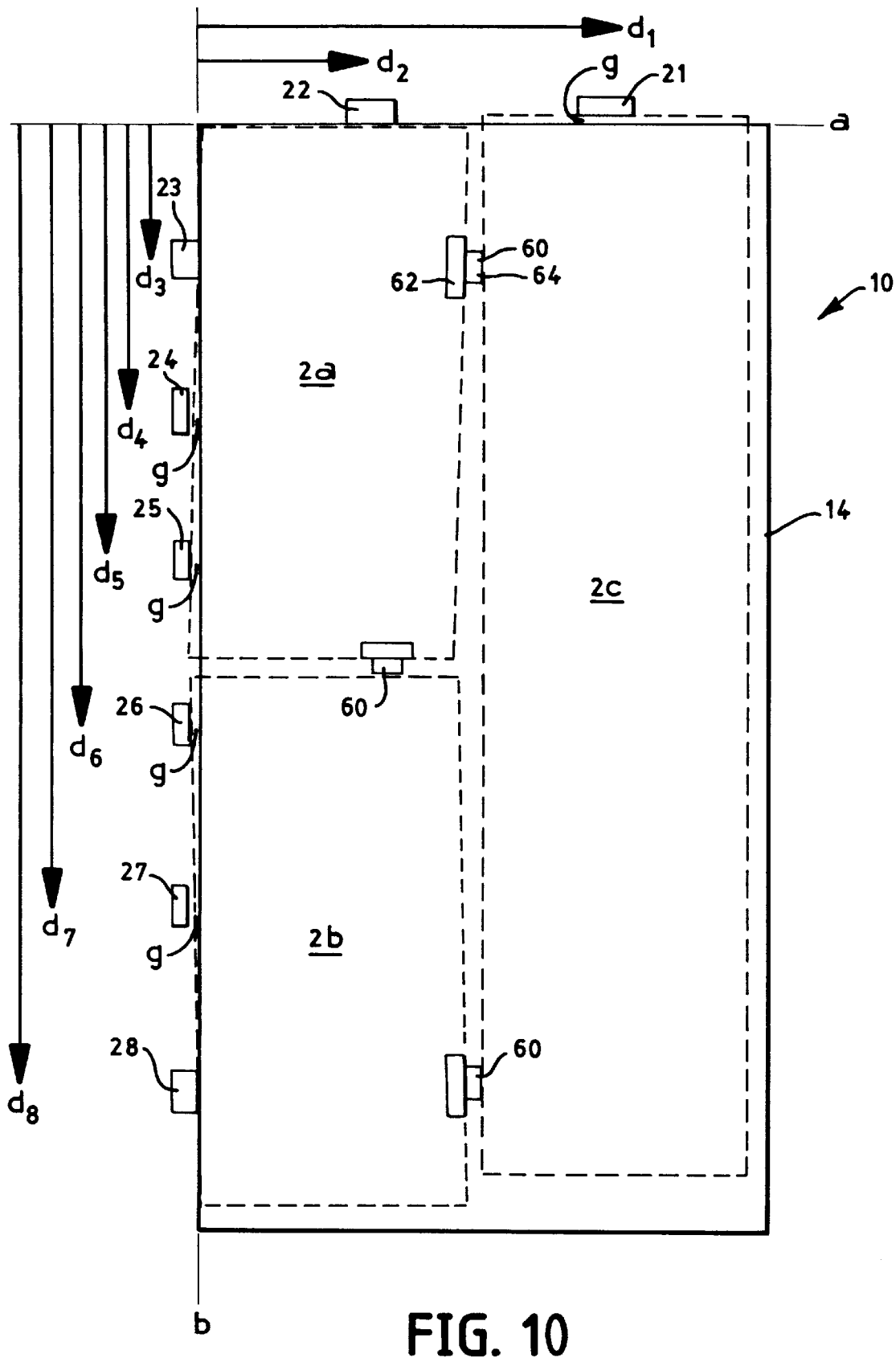

FIG. 10 shows the preferred alignment device 10 having two end posts 21 and 22 and six side posts 23–28. Surface 14 is approximately 8' by 24'. With this configuration, SIPs from 4' by 8' to 8' by 24' can be assembled, including, for example, 4' by 12', 4' by 16', 4' by 20', 4' by 24', 8' by 8', and 8' by 16'.

As shown, device has two stacks of SIPs 2a and 2b, each 4' by 12', and one stack of SIPs 2c, 4' by 24", assembled thereon, stack 2a assembled first, stack 2b assembled second, and stack 2c assembled last. Stack 2a is assembled and engages posts 22, 23, and 25, but not post 24. Before assembling stack 2b, drop indexer 60 is placed on stack 2a to function for stack 2b like post 22 did for stack 2a. Stack 2b is now assembled and engages the drop indexer on stack 2a and posts 26 and 28, but not post 27. A drop indexer 60 is now placed on stack 2a and 2b to function as two side posts for stack 2c. Stack 2c is now assembled and engages the two drop indexers on the side and post 21 on the end.

FIG. 10 shows a line "a" along the end edge of surface 14. End post 22 lies along line a. End post 21 is about $^{1}\!/_{2}$" from line a away from surface 14, the spacing shown as the letter "g". This relationship could be reversed, in that post 21 could lie along line a and post 22 could be $^{1}\!/_{2}$" away from line a. Line "b" runs along the side edge of surface 14. Side posts 23 and 28, the two outermost posts lie along line b. Posts 24, 25, 26, and 27 all are about $^{1}\!/_{2}$" from line b away from surface 14, shown as the letter "g".

End post 21 is a distance $d_1$ from line b and end post 22 is a distance $d_2$ from line b. Side post 23 is a distance $d_3$ from line a, side post 24 is a distance $d_4$ from line a, side post 25 is a distance $d_5$ from line a, side post 26 is a distance $d_6$ from line a, side post 27 is a distance $d_7$ from line a, and side post 28 is a distance $d_8$ from line a. For this 8' by 24' surface 14, $d_1$ is about 88", $d_2$ is about 32", $d_3$ is about 20", $d_4$ is about 68", $d_5$ is about 120", $d_6$ is about 172", $d_7$ is about 220", and $d_8$ is about 264".

These dimensions permit SIPs of all sizes currently manufactured to be assembled. For example, device 10 could be used to assemble 6 stacks of 4' by 8' SIPs. Stack 1 would engage posts 21, 22, and 23; stack 2 would engage post 24 and two drop indexers on stack 1; stack 3 would engage post 25 and two drop indexers on stack 2; stack 4 would engage post 26 and two drop indexers on stack 3; stack 5 would engage post 27 and two drop indexers on stack 4; and stack 6 would engage post 28 and two drop indexers on stack 5.

Four stacks of 4' by 12' SIPs could be assembled. Stack 1 would engage posts 22, 23, and 25, as shown as stack 2a in FIG. 10. Stack 2 would engage posts 26 and 28 and a drop indexer on stack 1, as shown as stack 2b in FIG. 10. Stack 3 would engage post 21 and two drop indexers on stack 1. Stack 4 would engage one drop indexer on stack 3 and two drop indexers on stack 2.

Two stacks of 4' by 16' SIPs could be assembled. Stack 1 would engage posts 22, 23, and 26. Stack 2 would engage posts 21 and two drop indexers on stack 1. Two stacks of 4' by 20' SIPs could be assembled. Stack 1 would engage posts 22, 23, and 27. Stack 2 would engage posts 21 and two drop indexers on stack 1. Two stacks of 4' by 24' SIPs could be assembled. Stack 1 would engage posts 22, 23, and 28. Stack 2 would engage posts 21 and two drop indexers on stack 1.

One stack of 8' by 24' SIPs could be assembled. Stack 1 would engage posts 22, 23, and 28, the three posts on lines a and b, respectively. FIG. 10 shows device being used to make three stacks of SIPs of two different sizes. From the above, those skilled in the art can see how to make many combinations of SIP sizes in one assembly operation. Also, those skilled in the art can easily see how to modify the size of surface 14 and the number of posts and the spacing thereof if SIPs of different sizes were to be manufactured. For example, if, instead of 4' by 8' SIPs, 3' by 6' SIPs were desired, the dimensions and spacing would simply be reduced by 25%. The key is that for any SIP, it should only engage 3 posts, one on the end and two on the sides.

The foregoing detailed description is given primarily for clearness of understanding and no unnecessary limitations are to be understood therefrom for modifications will become obvious to those skilled in the art upon reading this disclosure and may be made without departing from the spirit of the invention or the scope of the appended claims.

What is claimed is:

1. An alignment device, comprising:
    a base, said base having a generally horizontal surface, said base having a first end and a first side, said base having at least one channel therein;
    at least one end post at said first end, said at least one end post extending generally vertically upward from said base, said at least one end post secured to said base a first distance from said first side; and
    at least a first side post and a second side post at said first side, said first side post and said second side post extending generally vertically upward from said base, said first side post secured to said base a second distance from said first end, said second side post secured to said base a third distance from said first end, said third distance being greater than said second distance;
    said at least one end post and said at least said first side post and said second side post secured such that an item, said item having a first straight edge having a first length being at least said first distance and a second straight edge having a second length being at least said third distance, said second straight edge being transverse to said first straight edge, when placed onto said base can engage said at least one end post and said at least said first side post and said second side post.

2. The alignment device of claim 1, said channel receiving a roller assembly.

3. The alignment device of claim 1, said at least one channel comprising at least two channels.

4. An alignment device, comprising:
    a base, said base having a generally horizontal surface, said base having a first end, a second end and a first side;
    at least one end post at said first end secured to said base, said at least one end post extending generally vertically upward from said base, said at least one end post being spaced from said first side;
    a first end side post toward said first end extending generally vertically upward from said base and secured thereto;
    a second end side post toward said second end extending generally vertically upward from said base and secured thereto, said first end side post and said second end side post being on an imaginary line parallel said first side;
    at least one intermediate side post between said first end side post and said second end side post, said at least one intermediate side post extending generally vertically upward from said base, said at least one intermediate side post being a spaced distance from said imaginary line away from said first side and spaced away from said base;
    where said at least one end post and said first end side post, said at least one intermediate side post, and said second end side post are positioned such that an item, said item having a first straight edge and a second straight edge, said second straight edge being transverse to said first straight edge, when placed onto said base, can simultaneously engage only three of said at least one end post, said first end side post, said at least one intermediate side post, and said second end side post.

5. The device of claim 4, said base having at least one channel therein, said channel receiving a roller assembly.

6. The device of claim 4, where said at least one end post comprises a first and a second end post, said first end post abutting said first end, said second end post being said spaced distance away from said first end, where said first end post and said second end post and said first end side post, said at least one intermediate side post, and said second end side post are positioned such that said item, when placed onto said base, can simultaneously engage only three of said first end post, said second end post, said first end side post, said at least one intermediate side post, and said second end side post.

7. The device of claim 6, where said at least one intermediate side post comprises a first, a second, a third, and a fourth intermediate side post, where said first end post and said second end post and said first end side post, said first, second, third, and fourth intermediate side posts, and said second end side post are positioned such that said item, when placed onto said base, can simultaneously engage only three of said first end post, said second end post, said first end side post, said first, second, third, and fourth intermediate side posts, and said second end side post.

8. The device of claim 6, said base having at least one channel therein, said channel receiving a roller assembly.

9. The device of claim 6, said base having at least one pair of channels therein.

10. The device of claim 6, said base having at least a first and a second channel therein, said first channel receiving a first roller assembly and said second channel receiving a second roller assembly, said first channel and said second channel being generally parallel to said first side.

11. The device of claim 7 where said first end post is a first distance from said first side, said second end post is a second distance from said first side, said first end side post is a third distance from said first end, said first intermediate side post is a fourth distance from said first end, said second intermediate side post is a fifth distance from said first end, said third intermediate side post is a sixth distance from said first end, said fourth intermediate side post is a seventh distance from said first end, and said second end side post is an eighth distance from said first end; said third distance being less than said fourth distance being less than said fifth distance being less than said sixth distance being less than said seventh distance being less than said eighth distance.

12. The device of claim 11, where said first distance is less than said second distance.

13. The device of claim 11, where said second distance is less than said first distance.

14. The device of claim 11, said base having at least a first and a second channel therein, said first channel receiving a first roller assembly and said second channel receiving a second roller assembly, said first channel and said second channel being generally parallel to said first side, said surface having a width, said first channel being spaced a ninth distance from said first side, said second channel being spaced a tenth distance from said first side.

15. The device of claim 14, where said ninth distance is about ¼ said surface width and where said tenth distance is about ¾ said surface width.

* * * * *